Patented Dec. 26, 1950

2,535,380

UNITED STATES PATENT OFFICE 2,535,380

THERMOSETTING FORMALDEHYDE RESIN MODIFIED WITH A POLYETHYLENE GLYCOL BIS-(AMINOPHENYL) ETHER

Kenneth H. Adams, Fenton, and George L. Doelling, St. Louis, Mo., assignors to Mississippi Valley Research Laboratories, Inc., St. Louis, Mo., a corporation of Missouri No Drawing. Application July 20, 1949, Serial No. 105,890

33 Claims. (Cl. 260—45)

This invention relates to synthetic resins and more particularly to thermosetting synthetic resins.

Briefly, the invention comprises thermosetting resins prepared by reacting a polyethylene glycol bis-(aminophenyl) ether with certain resin compositions and the processes of preparing said thermosetting resins.

Among the several objects of this invention may be noted the provision of new and useful synthetic resins which can be used in molding, laminating and in surface coating; the provision of synthetic resins which are heat-hardened yet flexible; the provision of resins of the class described which are resistant to impact; the provision of useful articles manufactured from the novel resins of the class described and fillers; and, the provision of simple, effective and efficient methods of forming thermosetting resins. Other features will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

The usual phenol-aldehyde type thermosetting resins possess several characteristics which render them unsuitable for many purposes where they could otherwise be beneficially employed. Among some of these disadvantages are their inherent brittleness and low impact resistance. The thermosetting resins of the present invention, however, retain the desirable properties of the conventional thermosetting type resins and, moreover, are quite flexible and have a high degree of resistance to impact.

In accordance with the present invention novel thermosetting resins are prepared by the reaction in the presence of an aldehyde or an aldehyde producing substance of a heat-hardenable resin composition with a polyethylene glycol bis-(aminophenyl) ether of the type described in our copending application, Serial No. 28,513, filed May 21, 1948, which has a structural formula as follows:

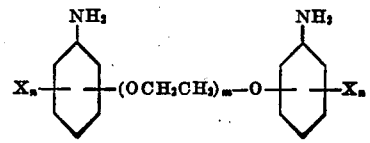

in which X is either chlorine or bromine, $m$ is an integer greater than 3 and not more than approximately 150, and $n$ is an integer including zero and not greater than 3. The term heat-hardenable resin composition is used to designate a composition which can be hardened into a hard, thermoset, insoluble resin simply by the application of heat. Such a heat-hardenable resin composition may comprise a soluble phenolformaldehyde resin, a soluble melamineformaldehyde resin, a ureaformaldehyde resin, or a mixed melamine-ureaformaldehyde resin. For example, spirit or water soluble phenolformaldehyde laminating varnishes, melamine-ureaformaldehyde laminating varnishes, ureaformaldehyde laminating varnishes, and acid-catalyzed phenolformaldehyde resins together with formaldehyde, are particularly desirable heat-hardenable resin compositions.

The heat-hardenable resin compositions may not require the addition of formaldehyde to react with the ethers to form the novel thermoset resins of the present invention. This is the case if the heat-hardenable resin portion of the reaction mixture itself contains sufficient —CH$_2$OH groups as with a casting resin having a high ratio of formaldehyde to phenol or of an analogous melamineformaldehyde composition. Resins made from a diamine and this type of heat-hardenable resin gave hard, insoluble final resins without the use of additional formaldehyde in the preparation of the final resin. Examples of suitable substances that will yield formaldehyde under certain conditions of heating and processing include hexamethylenetetramine and paraformaldehyde.

It is to be understood that the phenolformaldehyde resins used may include other resins such as those formed from formaldehyde and meta-cresol, or meta xylenol and mixtures of phenol and cresols and xylenols.

The —(OCH$_2$CH$_2$)$_m$—O— group of the polyethylene glycol bis-(aminophenyl) ether component may be substituted in either ring in any position in the aminobenzene nucleus not otherwise occupied. The same is also true of the halogen. The ethers represented by the foregoing formula include polyethylene glycol bis-(aminophenyl) ethers which have one or more methyl, ethyl, isopropyl, etc., groups substituted for hydrogen in one or both of the aminobenzene nuclei. These diamines can be made from the proper polyethylene glycol and a halonitrobenzene, with subsequent reduction of the nitro groups.

It has also been found in accordance with the present invention that diamines of polyethylene glycols lower than tetraethylene glycol are not suitable for forming the flexible, impact resistant thermosetting resins of the present invention as they form rather brittle compositions. The preferred resins are those made from the ethers of hexaethylene glycol, nonaethylene glycol and the ethylene glycol having an average molecular weight of 600, but any chain length polyethylene glycol from tetraethylene glycol even up to those having a molecular weight of at least approximately 6000 or more give final resins of desirable properties.

The synthetic resins of our invention can be coated on steel, cloth or wood or other substances as a surface coating which is very resistant to water, solvents, etc. It can also be used together with asbestos, cotton flock, chopped cloth or other filler to make molded and shaped articles, and by impregnating cotton cloth, nylon cloth or glass fiber products with this resin, laminates can be made that are resistant to shock and impact.

The following examples illustrate the invention.

Example 1

A diamine, made from 3,4-dichloronitrobenzene and nonaethylene glycol, and subsequent reduction of the nitro groups, having the formula:

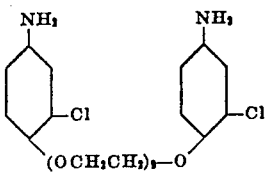

was used to make a resin as follows:

|  | G. |
|---|---|
| Bis-(2-chloro-4-aminophenyl) ether of nonaethylene glycol | 12 |
| Formaldehyde solution (37%) | 4.5 |
| Ethyl alcohol (95%) | 13.5 |
| Phenolformaldehyde laminating varnish ("Resinox 497") 60% solids | 20 |

A solution was made of these materials, and 1 or 2 milliliters of it was floated onto a glass microscope slide, the solvent allowed to evaporate, and the resulting film finally baked at 140° to 143° C. for 15 minutes. The film was clear at all stages showing that these materials are compatible, also it was hard at baking temperature and at room temperature, the composition having been converted by heat into a hard, insoluble resin. A similar film was formed by floating some of the above solution onto a flexible metal slide, and evaporating off the solvent and baking it at 140° to 143° C. for 15 minutes. The resulting film would stand considerable flexing before breaking. Phenolformaldehyde alone in this test will stand practically no flexing without cracking or breaking.

Example 2

A diamine, made from 3,4-dichloronitrobenzene and a polyethylene glycol having a molecular weight of approximately 1450 ("Carbowax 1540"), and subsequent reduction of the nitro groups, having the following approximate formula:

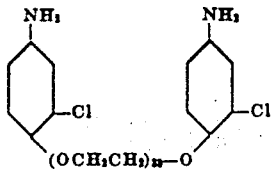

was used to make a resin, as follows:

|  | G. |
|---|---|
| The bis-(2-chloro-4-aminophenyl) ether of polyethylene glycol of molecular weight of approximately 1450 | 9.0 |
| Formaldehyde solution (37%) | 1.22 |
| Ethyl alcohol | 7.78 |
| Melamine formaldehyde resin ("Resimene 806") 50% solids | 18.0 |
| Boric acid | 0.18 |

A solution was made of these materials, and about 2 milliliters of this solution was floated onto a glass slide, the solvent allowed to evaporate, and the resulting film finally baked for 15 minutes at 145° C. The film was clear throughout and after baking it was hard and not soluble in an alcohol-acetone mixture. A film was similarly formed on a thin metal slide and after baking the resultant film was hard, light amber in color, and very flexible.

Example 3

The diamine described in Example 2 was used along with a phenolformaldehyde composition to form a resin.

|  | G. |
|---|---|
| The bis-(2-chloro-4-aminophenyl) ether of polyethylene glycol of molecular weight of approximately 1450 | 10.5 |
| Formaldehyde solution (37%) | 1.42 |
| Ethyl alcohol (95%) | 9.08 |
| Phenolformaldehyde solution ("Resinox 497") 60% solids | 40.0 |

This is approximately a 70–30 ratio of phenolformaldehyde to the polyglycol bis-(aminophenyl ether) plus formaldehyde, on a dry basis. A solution was made of these materials. They were mixed in the order given, and then 1 or 2 milliliters of this solution was floated onto a flexible metal slide, the solvents were evaporated off and the film baked for 15 minutes at 145° C. The resulting film was clear, hard and flexible. It would stand a right-angle bend without breaking and when tested with a mixture of alcohol and acetone there was no visible effect on the film, after 2 hours' immersion in this solvent mixture.

Example 4

A diamine, made from 3,4-dichloronitrobenzene and a polyethylene glycol having a molecular weight of approximately 1000 ("Carbowax 1000"), and subsequent reduction of the nitro groups, having the following approximate formula:

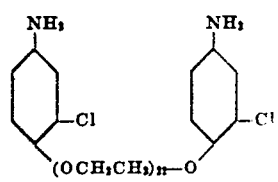

was used to make a resin, as follows:

| | G. |
|---|---|
| The bis-(2-chloro-4-amino phenyl) ether of polyethylene glycol of molecular weight of approximately 1000 | 6.2 |
| Formaldehyde solution (37%) | 1.22 |
| Ethyl alcohol | 4.8 |
| Melamineformaldehyde ("Resimene 806")— 50% solids | 12.0 |
| Boric acid | 0.12 |
| Ethylene glycol mono-methyl ether | 5.8 |

A solution was made of these materials, and 1 or 2 milliliters of it was floated onto a glass slide, the solvents allowed to evaporate and the film finally baked at 140° to 143° C. for about 18 minutes. The film was clear, showing that the ingredients are compatible. Also the film was hard at baking temperature and at room temperature and it was of a light amber color. Another film was similarly made on a flexible metal slide. The film was clear, hard and considerably flexible in contrast to a film made of melamineformaldehyde alone, which is brittle and usually will not stand any flexing at all without breaking.

Example 5

The diamine, made from 2,6-dichloro-3-nitrotoluene and a polyethylene glycol having a molecular weight of approximately 600 ("Polyethylene Glycol 600"), and subsequent reduction of the nitro groups, having the following approximate formula:

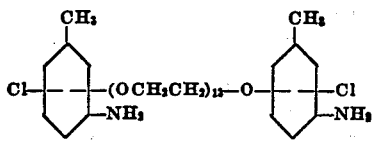

was used to make a resin as follows:

| | G. |
|---|---|
| The bis-(chloroaminotolyl) ether of polyethylene glycol of molecular weight of approximately 600 | 6.6 |
| Formaldehyde solution (37%) | 1.8 |
| Ethyl alcohol | 4.8 |
| Phenolformaldehyde ("Resinox 497")—60% solids | 11.0 |

A solution was made of these materials, and about 1 or 2 milliliters of it was floated onto a glass slide, the solvents allowed to evaporate, and the film baked at 138° to 143° C. for 20 minutes. The film was clear. A film was similarly made on a flexible metal slide. The film was hard and very flexible.

Example 6

The diamine, made from 2,5-dibromonitrobenzene and nonaethylene glycol, and subsequent reduction of the nitro groups, having the following approximate formula:

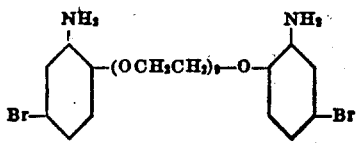

was used to make a resin as follows:

| | G. |
|---|---|
| The nonaethylene glycol bis-(4-bromo-2-aminophenyl) ether | 5.9 |
| Formaldehyde solution (37%) | 1.95 |
| Ethyl alcohol | 4.0 |
| Melamine formaldehyde ("Resimene 806")—50% solids | 11.3 |
| Boric acid | 0.12 |

A solution was made of these materials, and about 1 or 2 milliliters of it was floated onto a glass slide, the solvents allowed to evaporate, and the film baked at 140° to 143° C. for 18 minutes. The resulting film was clear showing compatibility of the various ingredients. Similarly a film was formed on a flexible metal slide of the same materials. The resulting film was hard at baking temperature and at room temperature, and had considerable flexibility whereas melamineformaldehyde resin alone usually has practically no flexibility at all.

Example 7

The diamine made from trichloronitrobenzene and polyethylene glycol having a molecular weight of approximately 600 ("Polyethylene Glycol 600"), and subsequent reduction of the two nitro groups, having the following approximate formula:

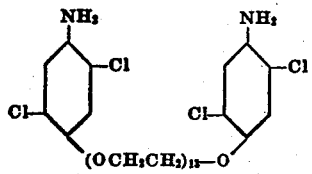

was used to make a resin as follows:

| | G. |
|---|---|
| The bis-(2,5-dichloro-4-aminophenyl) ether of polyethylene glycol of molecular weight of approximately 600 | 6.0 |
| Formaldehyde solution (37%) | 1.6 |
| Ethyl alcohol (95%) | 4.4 |
| Melamineformaldehyde solution (50% solids) ("Resimene 806") | 12.0 |
| Boric acid | 0.06 |

This is approximately a 50-50 mixture of the melamineformaldehyde and the diamine, on the dry basis. A solution was made of the above materials and about 1 or 2 milliliters of this solution was floated onto a flexible metal slide, the solvent evaporated off and the film then baked for 15 minutes at about 143° C. The film was clear, hard at baking temperature and at room temperature, and withstood bending through a 90° angle without breaking.

Example 8

A laminated panel was made from nylon cloth woven of spun fibre, the separate plies of which were bonded together with the following resin composition:

| | G. |
|---|---|
| The bis-(2-chloro-4-aminophenyl) ether of a polyethylene glycol of molecular weight of 600 | 140 |
| Formaldehyde solution (37%) | 37.8 |
| Acetone | 140 |
| Phenolformaldehyde resin ("Durite 3112") | 140 |
| Ethyl alcohol (95%) | 280 |

The phenolformaldehyde was first dissolved in about half of the ethyl alcohol. Then the diamine and formaldehyde were mixed with the acetone and the rest of the alcohol. After these were in solution, the two solutions were mixed and a number of pieces of nylon cloth, 12 inches x 12 inches each, were impregnated with this solution and then dried. Each piece of cloth weighed 16.9 g. originally and 40.0 g. after treating with resin solution and drying. Hence the treated cloth had a resin content of 57.7%. Eleven plies of this cloth were pressed under heat in a hydraulic press, at 135° to 140° C. for 20 minutes at about 1000 pounds per sq. in. The resulting laminate was well-bonded and had good resistance to impact. The tensile strength on a set of samples cut from this laminate was found to average 11,650 pounds per sq. in.

The phenolformaldehyde or melamineformaldehyde ingredient of our new resin can also be made in the presence of the diamine and the resulting resin solution used to make up the final laminate or molded piece.

Example 9

A batch was made up as follows:

|  | G. |
|---|---|
| Bis-(2-chloro-4-aminophenyl) ether of a polyethylene glycol of molecular weight of 600 | 54 |
| Melamine | 31.5 |
| Isopropyl alcohol | 24 |
| Formaldehyde solution (37%) | 94.5 |
| Ammonia solution (concentrated) | 2.8 |
| Sodium hydroxide (44% solution) | 1.4 |

These materials were mixed in the order listed, and then heated up to reflux temperature, and held at reflux temperature for two hours. After cooling this resin solution, the pH was adjusted to about 8, and 2 grams of chloroacetamide added. This solution was coated on cloth. The coated cloth was dried in air for about 18 hours and then dried in an oven at 100° to 105° C. for 15 minutes. A laminate was made from strips of this treated cloth by pressing at about 1000 pounds per sq. in. at about 140° C. for 20 minutes. A well-bonded, strong laminate resulted.

Example 10

A diamine made from 3,4-dichloronitrobenzene and a polyethylene glycol having a molecular weight of approximately 3350 ("Carbowax 4000") and subsequent reduction of the nitro-groups, having the following approximate formula:

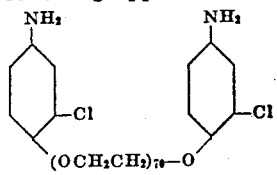

was used to make a resin as follows:

|  | G. |
|---|---|
| The bis - (2 - chloro - 4 - aminophenyl) ether of polyethylene glycol of molecular weight of approximately 3350 | 20 |
| Melamineformaldehyde ("Resimene 806") —50% solids | 30 |
| Boric acid | 0.25 |
| Formaldehyde solution (37%) | 1.35 |
| Ethyl alcohol (95%) | 18.6 |

A solution was made of these materials, and 1 or 2 milliliters of it was floated onto a flexible metal slide, the solvents allowed to evaporate, and the film finally baked at 145° C. for 15 minutes. The film was clear, non-tacky at baking temperature, and hard at room temperature. This film withstood bending through a considerable angle without breaking, also it was not visibly affected by immersion in a mixture of alcohol and acetone for one hour, hence is apparently insoluble in ordinary solvents.

A similar resin was made from the diamine made from 3,4-dichloronitrobenzene and a polyethylene glycol having a molecular weight of approximately 6000 ("Carbowax 6000") and subsequent reduction of the nitro-groups. This resin had properties similar to the above.

Example 11

A diamine made from paranitrochlorobenzene and hexaethylene glycol, and subsequent reduction of the nitro-groups, having the formula:

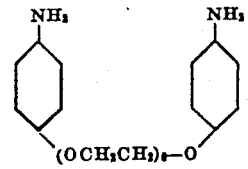

was used to make a resin as follows:

|  | G. |
|---|---|
| Bis-(4-aminophenyl) ether of hexaethylene glycol | 20 |
| Melamineformaldehyde (dry basis) | 20 |
| Formaldehyde solution (37%) | 11 |
| Boric acid | 0.4 |
| Methyl ethyl ketone | 12.5 |
| Ethyl alcohol (95%) | 12.5 |

A solution was made of these materials and 1 or 2 milliliters of it was floated onto a flexible metal slide, the solvents allowed to evaporate, and the film baked at 145° C. for 20 minutes. The film was hard at baking temperature and at room temperature and was fairly flexible as it would withstand about an 80° bend before breaking.

Example 12

In a manner similar to Example 9, urea, formaldehyde and a diamine were reacted to form a resin composition. The following materials were used:

|  | G. |
|---|---|
| Bis-(2-chloro-4-aminophenyl) ether of a polyethylene glycol of molecular weight of 600 | 7.75 |
| Urea | 6.0 |
| Isopropyl alcohol | 12 |
| Formaldehyde solution (37%) | 20.3 |
| Ammonia solution (concentrated) | 0.7 |
| Sodium hydroxide solution (50%) | 0.. |

These materials were mixed in the order listed and formed a clear solution. The solution was heated for 2 hours at about 90° C., cooled to room temperature, the pH adjusted to about 8 by the addition of acetic acid, and a small amount of chloroacetamide was added. Films were cast on glass and metal slides by floating on a small amount of the solution and then evaporating off the solvent, and baking at 145° C. for 25 minutes. These films were clear, hard and could be bent through a considerable angle without breaking.

This method of forming the urea-aldehyde resin in the reaction with the diamine is preferred rather than forming the resin first and then intermixing it with the diamine.

Example 13

In a manner similar to Example 12, urea, a melamine, formaldehyde and a diamine were reacted to form a resin composition. The following materials were used:

|  | G. |
|---|---|
| Bis-(2-chloro-4-aminophenyl) ether of a polyethylene glycol of molecular weight of 600 | 38.7 |
| Isopropyl alcohol | 47.0 |
| Formaldehyde solution (37%) | 80.0 |
| Melamine | 12.6 |
| Urea | 15.0 |
| Ammonia, concentrated solution | 2.8 |
| Sodium hydroxide (40% solution) | 1.5 |

These materials were mixed in the order listed and were then heated at reflux temperature for 2 hours, the solution was then cooled, and the pH was adjusted to 7.0 to 7.5 by the addition of acetic acid. Then boric acid (2% of the weight of the diamine) was added and about 25 milliliters of ethylene glycol monomethyl ether. Test plates were made of this resin solution by floating 1 or 2 milliliters of this solution onto a flexible metal slide, allowing the solvents to evaporate, and finally baking the film at 145° C. for 15 minutes. This film was clear, hard, and very flexible, as it would withstand bending through more than a 90° angle without breaking. The film was not affected by immersion for one hour in a solvent consisting of equal parts of acetone and ethyl alcohol.

In making the resins of this invention, the ratio of diamine to heat-hardenable resin used can be varied considerably. These materials are compatible in all proportions. However, the most desirable results usually are secured by use of approximately a 50–50 ratio. In the case of the very long chain diamines, as little as 10% to 25% diamine with 90% to 75% of heat-hardenable resin, gives good results. With the shorter-chain diamines such as tetra- or hexa- a high ratio of diamine can be used, with a relatively low proportion of heat-hardenable resin.

The amount of formaldehyde added to the diamine and resin in the above examples can be varied considerably without greatly affecting the properties of the final resin. However, if the resin used contains little or no available formaldehyde, as in the case of an acid-catalyzed phenolformaldehyde resin, then we prefer to add from 2 to 3 mols of formaldehyde per mol of diamine in the reaction mixture.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. A heat-hardened synthetic resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

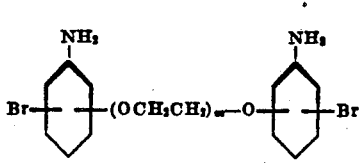

in which $m$ is an integer greater than 3 and not more than approximately 150, and $n$ is an integer including zero and not greater than 3.

2. A molded article which comprises an inert filler and a substantially insoluble heat-hardened resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

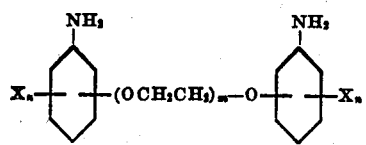

in which X is selected from the group consisting of chlorine and bromine, $m$ is an integer greater than 3 and not more than approximately 150, and $n$ is an integer including zero and not greater than 3.

3. An article comprising a structure having thereon a surface coating which comprises a substantially insoluble heat-hardened resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

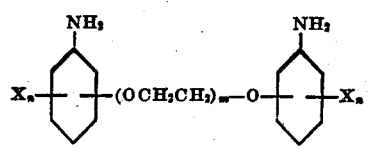

in which X is selected from the group consisting of chlorine and bromine, $m$ is an integer greater than 3 and not more than approximately 150, and $n$ is an integer including zero and not greater than 3.

4. A laminated article which comprises a fibre base and a substantially insoluble heat-hardened resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

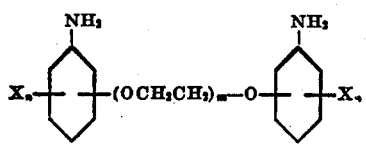

in which X is selected from the group consisting of chlorine and bromine, $m$ is an integer greater than 3 and not more than approximately 150, and $n$ is an integer including zero and not greater than 3.

5. A shaped article which comprises an inert filler and a substantially insoluble heat-hardened resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

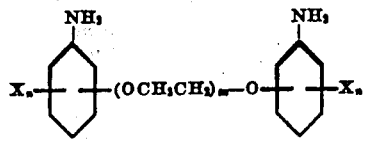

in which X is selected from the group consisting of chlorine and bromine, $m$ is an integer greater than 3 and not more than approximately 150, and $n$ is an integer including zero and not greater than 3.

6. A heat-hardened synthetic resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehye, and a diamine having the formula:

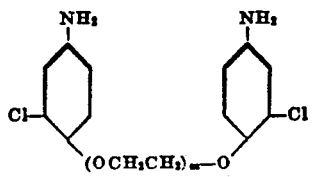

in which $m$ is an integer greater than 3 and not more than approximately 150.

7. A heat-hardened synthetic resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

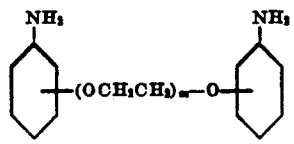

in which $m$ is an integer greater than 3 and not more than approximately 150.

8. A heat-hardened synthetic resin comprising the product of reaction under heat and in the presence of a substance selected from the group consisting of formaldehyde and a formaldehyde-yielding substance of a heat-hardenable resin composition selected from the group consisting of phenolformaldehyde, melamineformaldehyde, ureaformaldehyde, and mixed melamine-ureaformaldehyde, and a diamine having the formula:

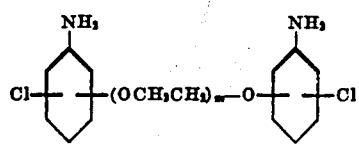

in which $m$ is an integer greater than 3 and not more than approximately 150.

9. A substantially insoluble heat-hardened resin which comprises the product of reaction under heat and in the presence of a substance selected from the group consisting of formaldehyde and a formaldehyde-yielding substance of a resin selected from the group consisting of phenolformaldehyde, melamineformaldehyde, ureaformaldehyde, and mixed melamine-ureaformaldehyde, and a diamine having the formula:

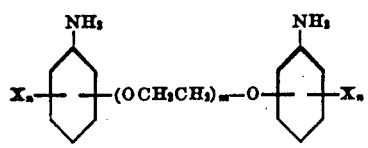

in which X is selected from the group consisting of chlorine and bromine, $m$ is an integer greater than 3 and not more than approximately 150, and $n$ is an integer including zero and not greater than 3.

10. A substantially insoluble heat-hardened resin comprising the product of reaction under heat of a phenol-formaldehyde casting resin, and a diamine having the formula:

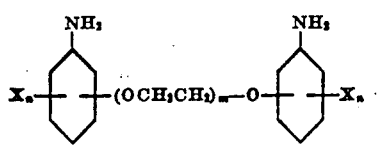

in which X is selected from the group consisting of chlorine and bromine, $m$ is an integer greater than 3 and not more than approximately 150, and $n$ is an integer including zero and not greater than 3.

11. A substantially insoluble heat-hardened resin comprising the product of reaction under heat and in the presence of a substance selected from the group consisting of formaldehyde and a formaldehyde-yielding substance of a heat-hardenable phenolformaldehyde resin composition, and a diamine having the formula:

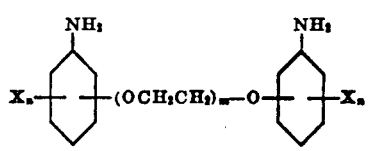

in which X is selected from the group consisting of chlorine and bromine, $m$ is an integer greater than 3 and not more than approximately 150, and $n$ is an integer including zero and not greater than 3.

12. A substantially insoluble heat-hardened resin comprising the product of reaction under heat and in the presence of a substance selected from the group consisting of formaldehyde and a formaldehyde-yielding substance of a heat-hardenable melamineformaldehyde resin composition, and a diamine having the formula:

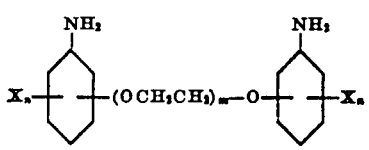

in which X is selected from the group consisting of chlorine and bromine, $m$ is an integer greater than 3 and not more than approximately 150, and $n$ is an integer including zero and not greater than 3.

13. A substantially insoluble heat-hardened resin comprising the product of reaction under heat and in the presence of a substance selected from the group consisting of formaldehyde and a formaldehyde-yielding substance of a heat-hardenable ureaformaldehyde resin composition, and a diamine having the formula:

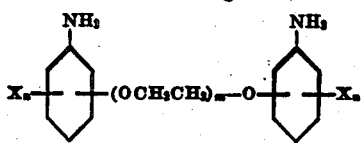

in which X is selected from the group consisting of chlorine and bromine, m is an integer greater than 3 and not more than approximately 150, and n is an integer including zero and not greater than 3.

14. A substantially insoluble heat-hardened resin comprising the product of reaction under heat and in the presence of a substance selected from the group consisting of formaldehyde and a formaldehyde-yielding substance of a heat-hardenable mixed melamine-ureaformaldehyde resin composition, and a diamine having the formula:

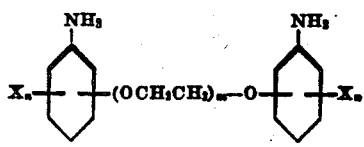

in which X is selected from the group consisting of chlorine and bromine, m is an integer greater than 3 and not more than approximately 150, and n is an integer including zero and not greater than 3.

15. A substantially insoluble heat-hardened resin which comprises the product of reaction under heat and in the presence of a substance selected from the group consisting of formaldehyde and a formaldehyde-yielding substance of a heat-hardenable phenolformaldehyde resin composition, and a diamine having the formula:

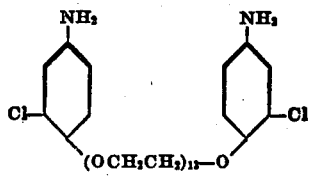

16. The method of forming a substantially insoluble heat-hardened resin which comprises reacting under heat and in the presence of a substance selected from the group consisting of formaldehyde and a formaldehyde-yielding substance a heat-hardenable resin composition selected from the group consisting of phenolformaldehyde, melamineformaldehyde, ureaformaldehyde and mixed melamine-ureaformaldehyde, with a diamine having the formula:

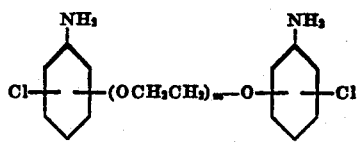

in which m is an integer greater than 3 and not more than approximately 150, and n is an integer including zero and not greater than 3.

17. The method of forming a substantially insoluble heat-hardened resin which comprises reacting under heat and in the presence of a substance selected from the group consisting of formaldehyde and a formaldehyde-yielding substance a first stage resin selected from the group consisting of phenolformaldehyde, melamine- formaldehyde, ureaformaldehyde and mixed melamine-ureaformaldehyde, and a diamine having the formula:

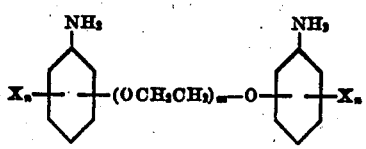

in which X is selected from the group consisting of chlorine and bromine, m is an integer greater than 3 and not more than approximately 150, and n is an integer including zero and not greater than 3.

18. The method of forming a substantially insoluble heat-hardened resin which comprises reacting under heat a phenol-formaldehyde casting resin with a diamine having the formula:

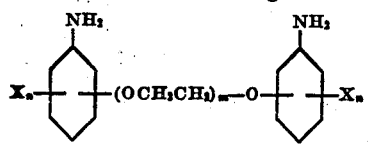

in which X is selected from the group consisting of chlorine and bromine, m is an integer greater than 3 and not more than approximately 150, and n is an integer including zero and not greater than 3.

19. The method of forming a substantially insoluble heat-hardened resin which comprises reacting under heat and in the presence of a substance selected from the group consisting of formaldehyde and a formaldehyde-yielding substance a heat-hardenable phenolformaldehyde resin composition with a diamine having the formula:

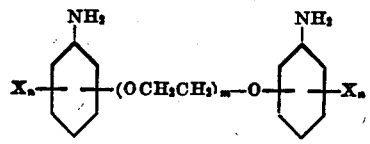

in which X is selected from the group consisting of chlorine and bromine, m is an integer greater than 3 and not more than approximately 150, and n is an integer including zero and not greater than 3.

20. The method of forming a substantially insoluble heat-hardened resin which comprises reacting under heat and in the presence of a substance selected from the group consisting of formaldehyde and a formaldehyde-yielding substance a heat-hardenable melamineformaldehyde resin composition with a diamine having the formula:

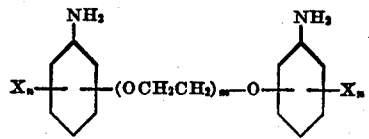

in which X is selected from the group consisting of chlorine and bromine, m is an integer greater than 3 and not more than approximately 150, and n is an integer including zero and not greater than 3.

21. The method of forming a substantially insoluble heat-hardened resin which comprises reacting under heat and in the presence of a substance selected from the group consisting of formaldehyde and a formaldehyde-yielding substance a heat-hardenable ureaformaldehyde resin composition with a diamine having the formula:

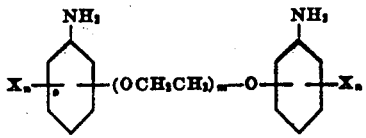

in which X is selected from the group consisting of chlorine and bromine, m is an integer greater than 3 and not more than approximately 150, and n is an integer including zero and not greater than 3.

22. The method of forming a substantially insoluble heat-hardened resin which comprises reacting under heat and in the presence of a substance selected from the group consisting of formaldehyde and a formaldehyde-yielding substance a heat-hardenable mixed melamine-ureaformaldehyde resin composition with a diamine having the formula:

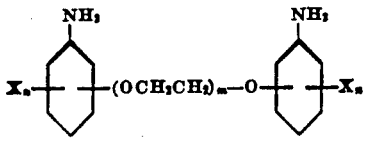

in which X is selected from the group consisting of chlorine and bromine, m is an integer greater than 3 and not more than approximately 150, and n is an integer including zero and not greater than 3.

23. The method of forming a substantially insoluble heat-hardened resin which comprises reacting under heat urea and melamine with formaldehyde and a diamine having the formula:

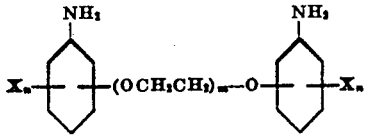

in which X is selected from the group consisting of chlorine and bromine, m is an integer greater than 3 and not more than approximately 150, and n is an integer including zero and not greater than 3.

24. The method of forming a substantially insoluble heat-hardened resin which comprises reacting under heat urea, formaldehyde and a diamine having the formula:

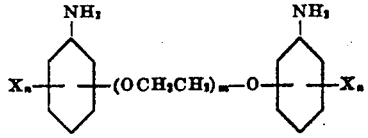

in which X is selected from the group consisting of chlorine and bromine, m is an integer greater than 3 and not more than approximately 150, and n is an integer including zero and not greater than 3.

25. The method of forming a substantially insoluble heat-hardened resin which comprises reacting under heat melamine, formaldehyde and a diamine having the formula:

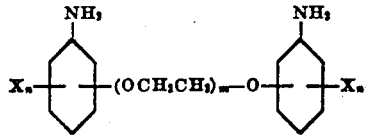

in which X is selected from the group consisting of chlorine and bromine, m is an integer greater than 3 and not more than approximately 150, and n is an integer including zero and not greater than 3.

26. A substantially insoluble heat-hardened resin comprising the product of reaction under heat of a melamineformaldehyde casting resin, and a diamine having the formula:

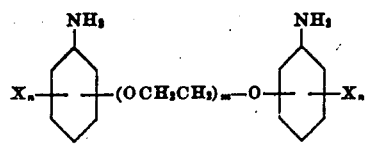

in which X is selected from the group consisting of chlorine and bromine, m is an integer greater than 3 and not more than approximately 150, and n is an integer including zero and not greater than 3.

27. The method of forming a substantially insoluble heat-hardened resin which comprises reacting under heat a melamineformaldehyde casting resin with a diamine having the formula:

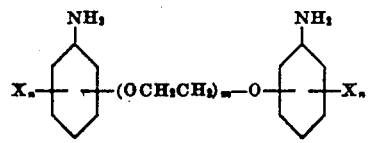

in which X is selected from the group consisting of chlorine and bromine, m is an integer greater than 3 and not more than approximately 150, and n is an integer including zero and not greater than 3.

28. The method of forming a substantially insoluble heat-hardened resin which comprises reacting under heat and in the presence of a substance selected from the group consisting of formaldehyde and a formaldehyde-yielding substance a heat-hardenable resin composition selected from the group consisting of phenolformaldehyde, melamineformaldehyde, ureaformaldehyde and mixed melamine-ureaformaldehyde, with a diamine having the formula:

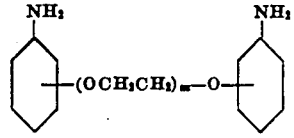

in which m is an integer greater than 3 and not more than approximately 150, and n is an integer including zero and not greater than 3.

29. The method of forming a substantially insoluble heat-hardened resin which comprises reacting under heat and in the presence of a substance selected from the group consisting of formaldehyde and a formaldehyde-yielding substance a heat-hardenable resin composition selected from the group consisting of phenolformaldehyde, melamineformaldehyde, ureaformaldehyde and mixed melamine-ureaformaldehyde, with a diamine having the formula:

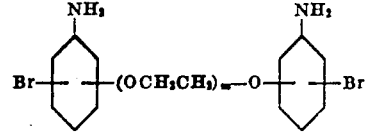

in which m is an integer greater than 3 and not more than approximately 150, and n is an integer including zero and not greater than 3.

30. A substantially insoluble heat-hardened resin which comprises the product of reaction under heat and in the presence of a substance selected from the group consisting of formaldehyde and a formaldehyde-yielding substance of a heat-hardenable phenolformaldehyde resin composition, and a diamine having the formula:

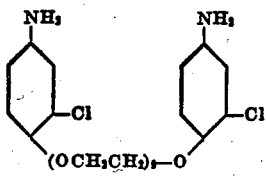

31. A substantially insoluble heat-hardened resin which comprises the product of reaction under heat and in the presence of a substance selected from the group consisting of formaldehyde and a formaldehyde-yielding substance of a heat-hardenable melamineformaldehyde resin composition, and a diamine having the formula:

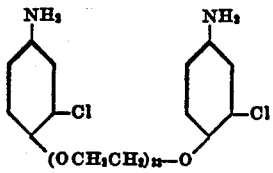

32. A substantially insoluble heat-hardened resin which comprises the product of reaction under heat and in the presence of a substance selected from the group consisting of formaldehyde and a formaldehyde-yielding substance of a heat-hardenable melamineformaldehyde resin composition, and a diamine having the formula:

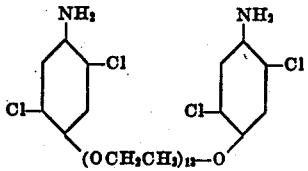

33. A substantially insoluble heat-hardened resin which comprises the product of reaction under heat and in the presence of a substance selected from the group consisting of formaldehyde and a formaldehyde-yielding substance of a heat-hardenable melamineformaldehyde resin composition, and a diamine having the formula:

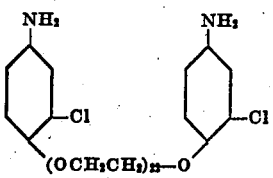

KENNETH H. ADAMS.
GEORGE L. DOELLING.

No references cited.